Patented May 4, 1937

2,079,339

UNITED STATES PATENT OFFICE 2,079,339

OPAQUE VITREOUS ENAMEL COMPOSITION

Robert R. Shively, Washington, Pa., assignor to B. F. Drakenfeld & Co., Inc., New York, N. Y., a corporation of New York No Drawing. Application August 27, 1934, Serial No. 741,737

12 Claims. (Cl. 106—36.2)

In the art of vitrifiable enamels, it has long been known that compounds of molybdenum, vanadium and tungsten, particularly lead compounds of these elements, produced opacity. Opacity has also been produced in glass, an analogous material, by the use of various phosphates, primarily calcium phosphate.

I have discovered that a complex compound, in which a basic element such as lead is combined with both a molybdate and phosphate radical, has a materially greater opacifying property than compounds such as lead molybdate or lead phosphate used separately or mixtures of these compounds.

I have also found that the same is true of tungsten, that when a base such as lead is combined with both a tungsten radical and a phosphate radical, better opacity is obtained than in the use of the lead tungstate or lead phosphate or mixtures of these compounds.

I have also observed that some of the more complex vanadium salts give better opacity than any of the lead vanadates. Some of the complex vanadium compounds referred to above also contain radicals other than vanadium and phosphorus. Some of the compounds used were lead diphosphatoctodecavanadatohexamolybdate, lead diphosphatoctovanadatododecamolybdate, and lead diphosphatoctovanadatopentadecamolybdate.

Opacity in vitrifiable substances, where the opacifying compound is milled in with the flux, is due to the insolubility of the opacifying compound in the flux when sufficiently heated to adhere to the surface of an article to which it is applied. Better opacity is obtained from the more insoluble opacifying compounds and due to this greater insolubility the opacifying compound can be used in a finer state of division. When the opacifying compound is melted with the flux, due to the higher temperature some of it may go in solution in the flux, but as the flux cools the opacity increases due to the opacifying compound being less soluble in the flux as the temperature decreases and opacity is produced by the opacifying compounds being thrown out of solution in the flux.

These various complex compounds may be produced in either the dry way or by precipitation from solution. When the lead phosphomolybdate is to be formed by dry method, molecular quantities to form that compound, of lead oxide, of a phosphate and molybdic oxide are thoroughly mixed and heated until they combine chemically and the reaction is completed. Other salts described may be synthesized from their constituents in a similar way.

In the wet process lead phosphomolybdate may be formed by boiling a neutral solution of a salt, as example a lead salt with phosphatomolybdic acid. Various bases may be substituted for lead and some of the salts so formed have desirable opacifying qualities in vitrifiable enamels.

The various tungsten and vanadium compounds may be formed in the dry or wet way and in a manner analogous to those above described. In the dry process, molecular quantities of the raw material, sufficient to form the compound desired, are thoroughly mixed and heated until the reaction is completed. In the wet way a neutral solution of the salt containing the desired base is added to a solution of the desired acid, and the opacifying substance is precipitated.

The desired opacifying compound whether prepared in the wet or dry way is used in a similar manner. The opacifying compound is added to a flux, the composition of which is varied to regulate the melting point desired in the finished enamel, which should be lower than the softening temperature of the article to which the enamel is to be applied, which may be glass, ceramic ware or even metal.

When the coloring pigment is added to my enamel less of the opacifying compound is generally needed and more lead oxide is required in the flux in order to reduce the melting point of my finished product and thereby counteract the tendency of the inert coloring matter added to raise the melting point of the enamel.

The opacifying agents described have but little influence upon the melting temperature of the fluxes to which they are added. The amount of my opacifying agents used depends upon the fluxes, some of which are themselves somewhat opaque and upon the coloring pigments used, as well as the opacity desired in the finished product. In white glass enamels, I may use 25%, more or less, of the opacifying compound, while in colored enamels as low as 2% is sometimes sufficient.

My opacifying compounds may be added to a flux composed of lead oxide, silica and boric anhydride. The material is ground to 325 mesh, more or less, mixed with a liquid such as an oil, turpentine or water, and sprayed, painted or applied to the article in any manner known to the art, then heated to a temperature such that my enamel melts and adheres to the surface of the article.

Molybdenum and tungsten are metallic elements of the even series of the sixth periodic group having atomic weights between 95 and 185. Vanadium is a metallic element of the fifth periodic group having a molecular weight between 50 and 52.

The following represents the composition of one flux which I have used—

|  | Parts |
|---|---|
| PbO | 78 |
| $B_2O_3$ | 10 |
| $SiO_2$ | 12 |

The foregoing is descriptive of preferred forms of my composition and products and is not intended as restricting the claims.

I claim:

1. A composition for the production of a vitrifiable enamel comprising lead borate and a compound of the group consisting of lead phosphomolybdate, lead phosphotungstate, and lead phosphovanadate.

2. A composition for the production of a vitrifiable enamel comprising lead borosilicate and a compound of the group consisting of lead phosphomolybdate, lead phosphotungstate, and lead phosphovanadate.

3. A composition for the production of a vitrifiable enamel comprising lead borate and a complex salt containing the base lead combined with a radical containing phosphorus, vanadium and molybdenum as the medium for producing opacity.

4. A composition for the production of a vitrifiable enamel comprising lead borosilicate and a complex salt containing the base lead combined with a radical containing phosphorus, vanadium and molybdenum as the medium for producing opacity.

5. A composition for the production of an opaque vitrifiable enamel comprising a compound including a plurality of the group consisting of lead phosphomolybdate, lead phosphotungstate, and lead phosphovanadate, melted directly with a flux.

6. A composition for the production of a vitrifiable enamel comprising a borate and a base combined with a radical of the group consisting of lead phosphomolybdate, lead phosphotungstate, and lead phosphovanadate.

7. A composition for the production of a vitrifiable enamel comprising a compound of a plurality of the group consisting of lead phosphomolybdate, lead phosphotungstate, and lead phosphovanadate.

8. A composition for the production of a vitrifiable enamel comprising lead borate and a compound comprising a phosphate radical and a radical of the group consisting of molybdenum, vanadium and tungsten.

9. A composition for the production of a vitrifiable enamel comprising lead combined with a phosphate radical and a radical of the group consisting of molybdenum, tungsten and vanadium.

10. A composition for the production of a vitrifiable enamel comprising a base combined with a plurality of opacifying agents including one of the group consisting of lead phosphomolybdate, lead phosphotungstate, and lead phosphovanadate, as the medium for producing opacity.

11. A vitreous enamel comprising a plurality of opacifying agents including one of the group consisting of lead phosphomolybdate, lead phosphotungstate, and lead phosphovanadate.

12. A composition for the production of an opaque vitreous enamel comprising a plurality of opacifying agents including one or more of the group consisting of phosphomolybdate, phosphotungstate, and phosphovanadate, adapted to combine with a lead compound to render the enamel opaque.

ROBERT R. SHIVELY.